J. M. SCHUTZ.
CATERPILLAR WHEEL.
APPLICATION FILED JAN. 8, 1918.
1,319,120.
Patented Oct. 21, 1919.
7 SHEETS—SHEET 1.
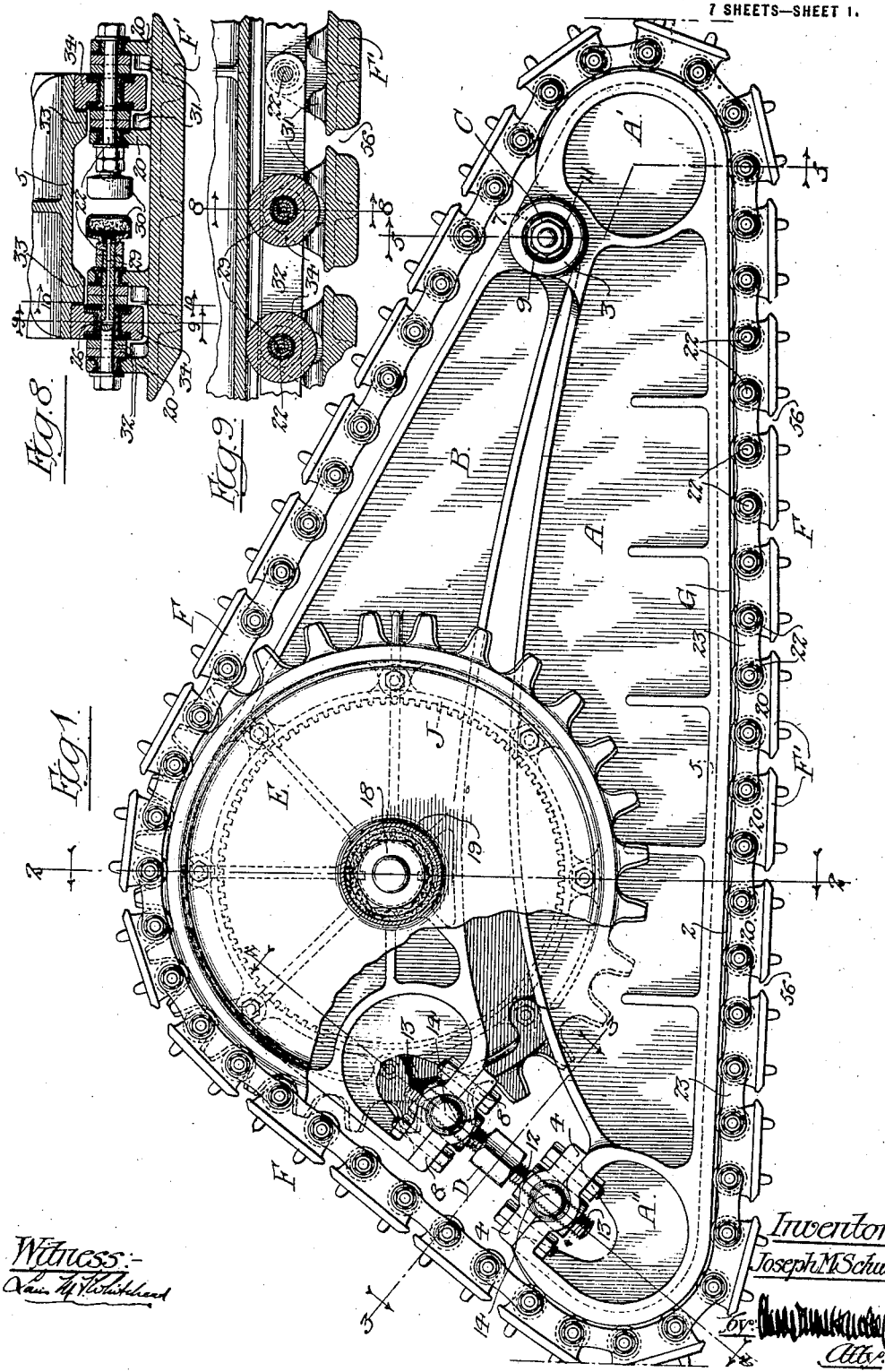

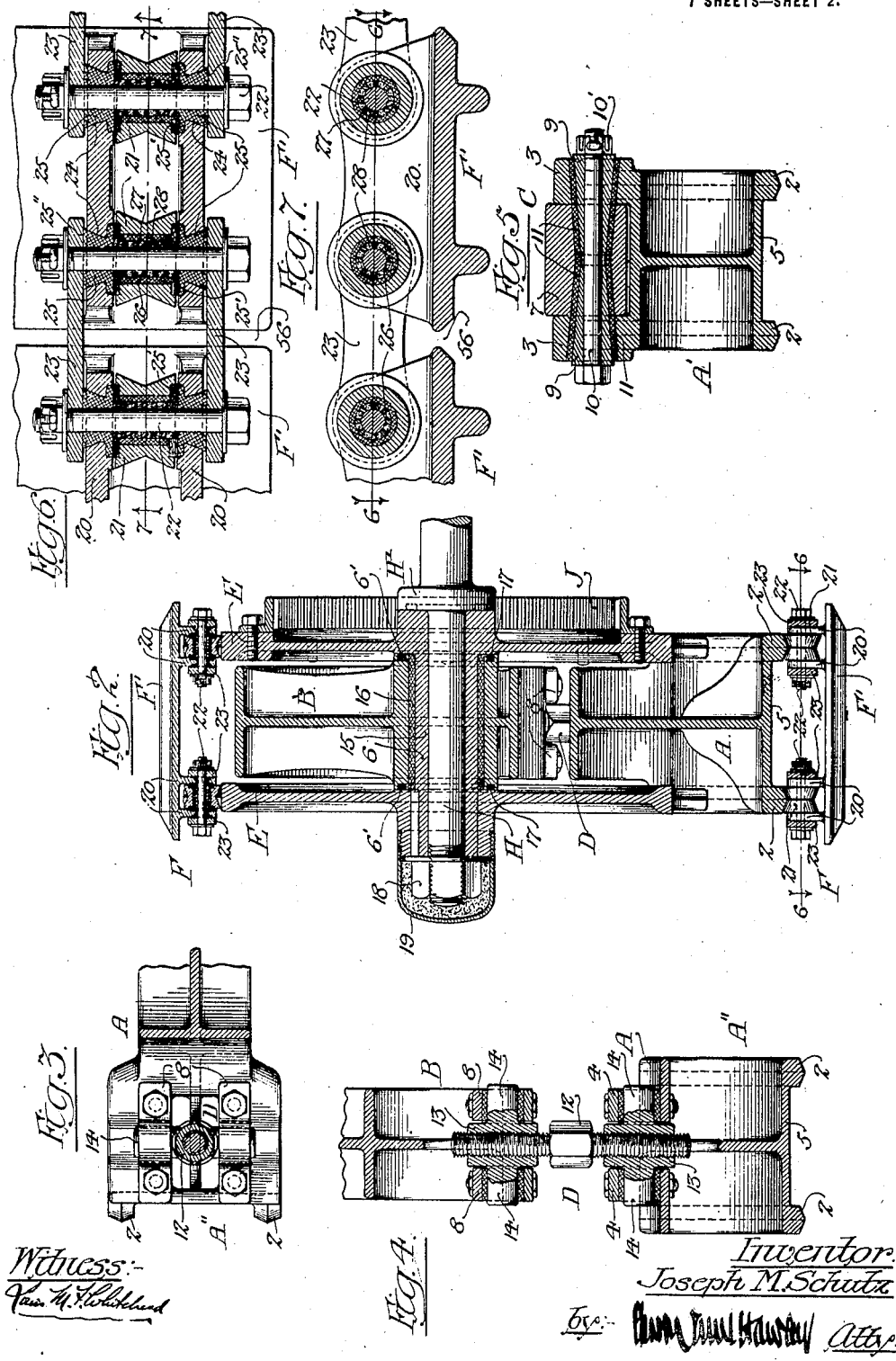

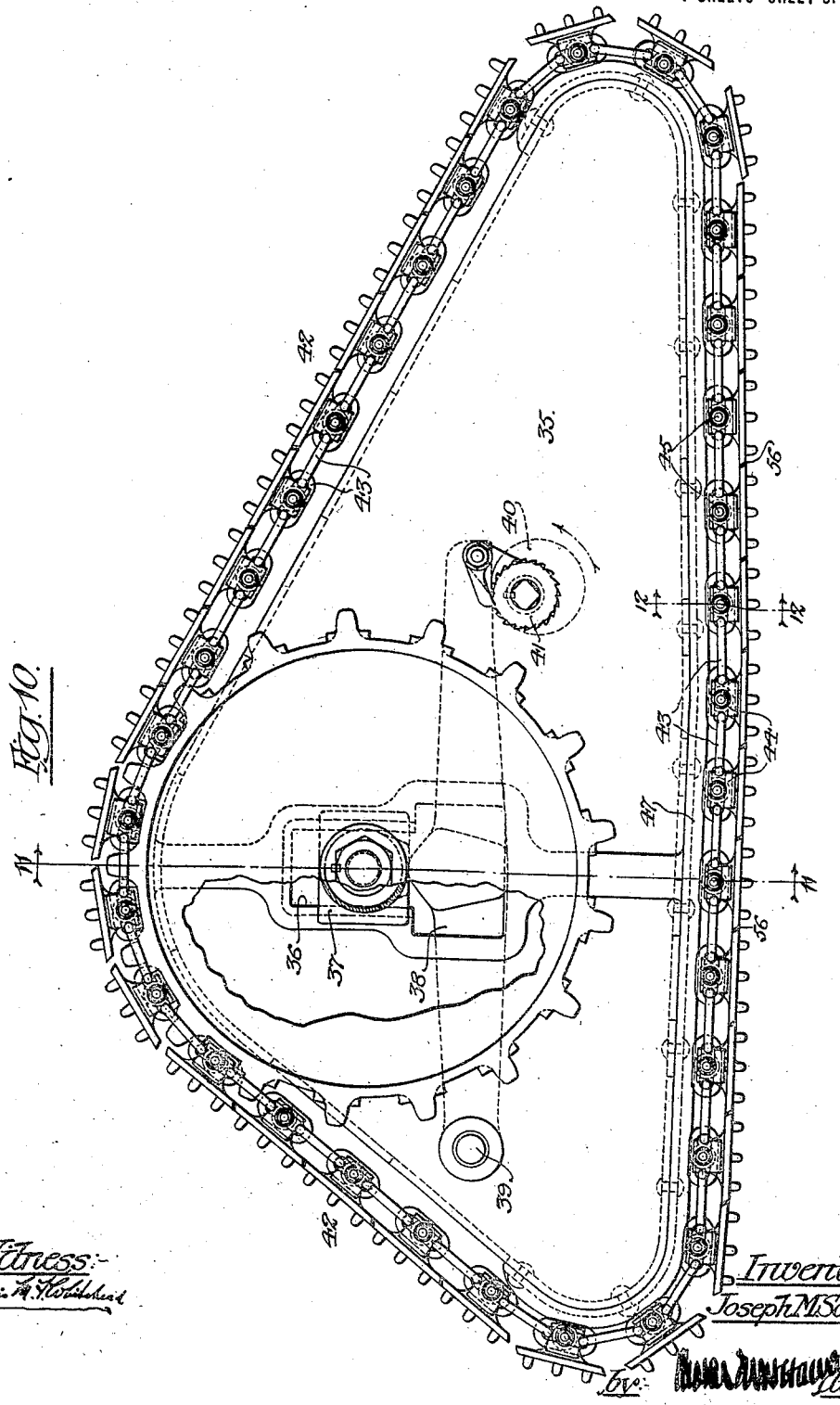

J. M. SCHUTZ.
CATERPILLAR WHEEL.
APPLICATION FILED JAN. 8, 1918.
1,319,120.
Patented Oct. 21, 1919.
7 SHEETS—SHEET 4.
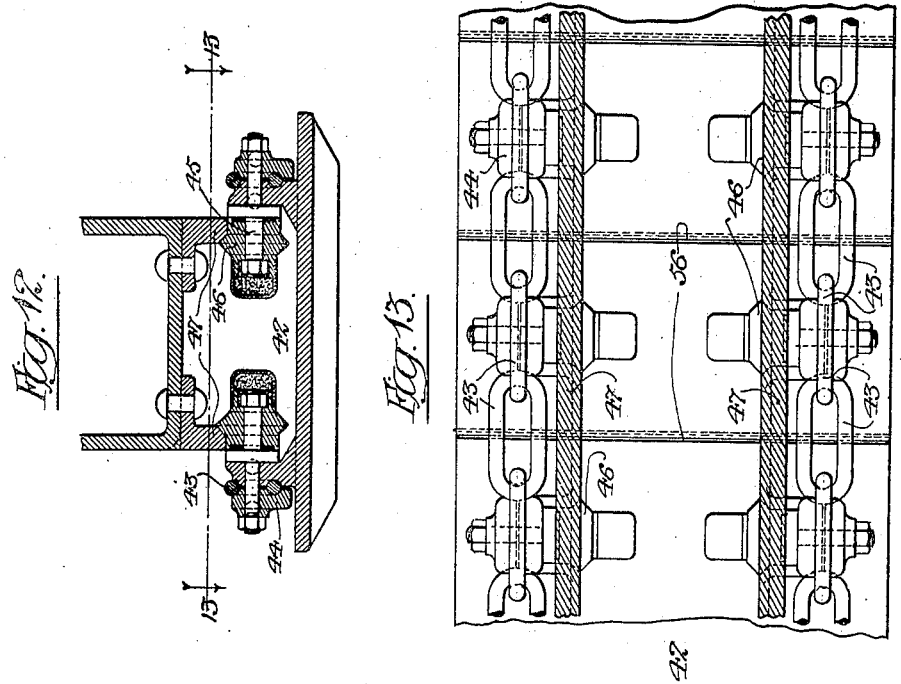
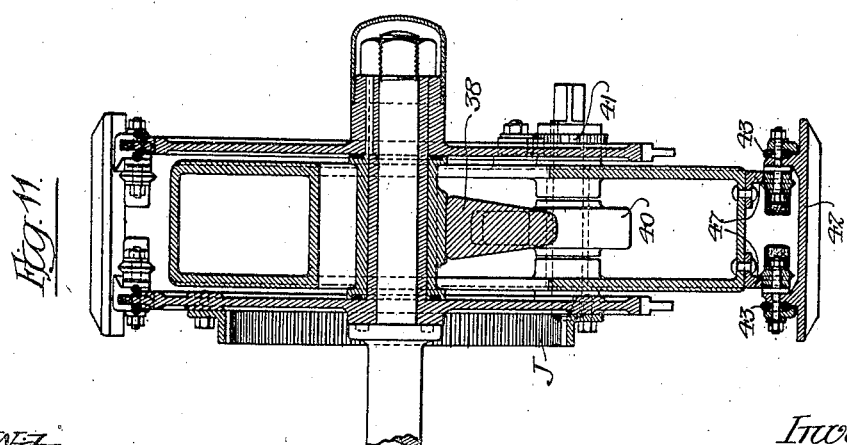

J. M. SCHUTZ.
CATERPILLAR WHEEL.
APPLICATION FILED JAN. 8, 1918.
1,319,120.
Patented Oct. 21, 1919.
7 SHEETS—SHEET 5.
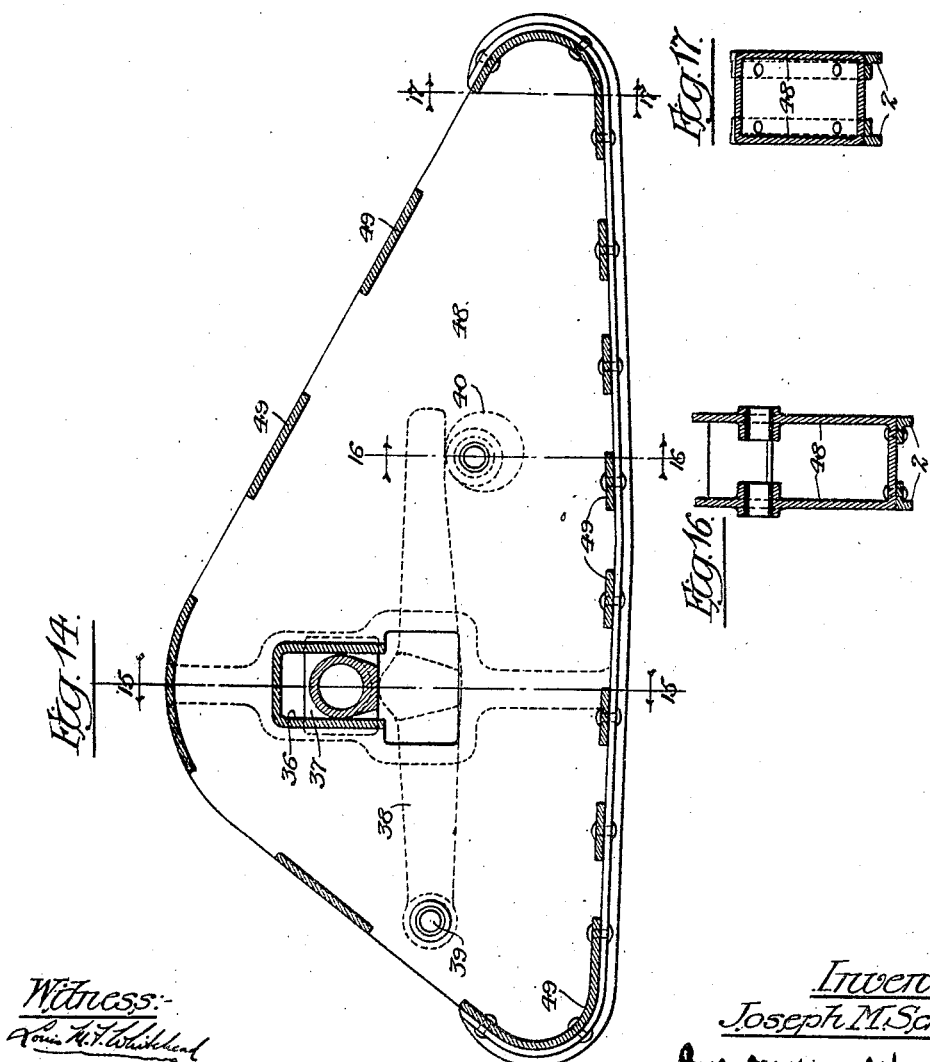

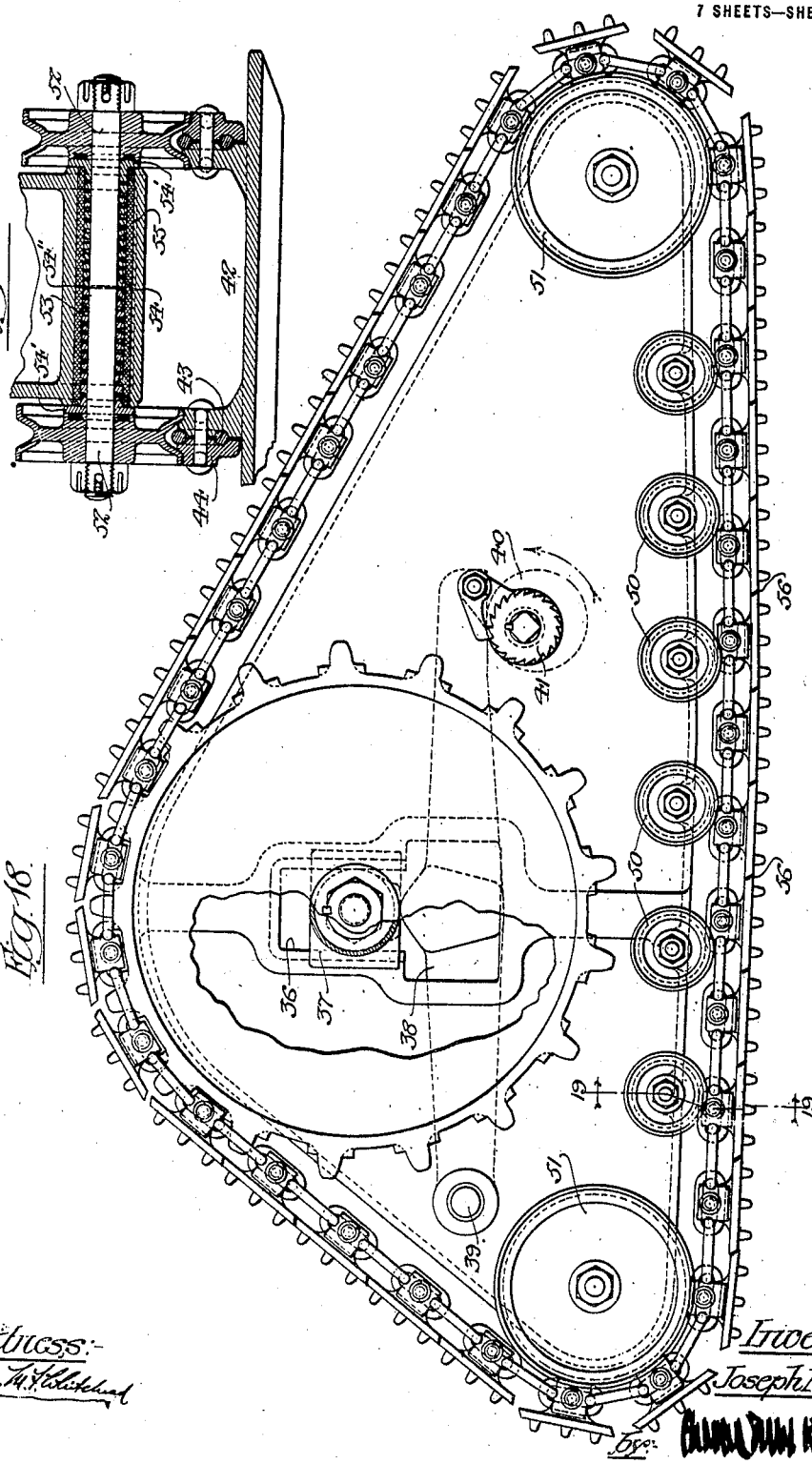

J. M. SCHUTZ.
CATERPILLAR WHEEL.
APPLICATION FILED JAN. 8, 1918.
1,319,120.
Patented Oct. 21, 1919.
7 SHEETS—SHEET 7.
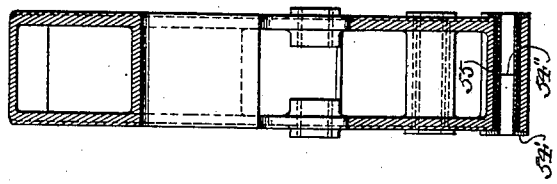
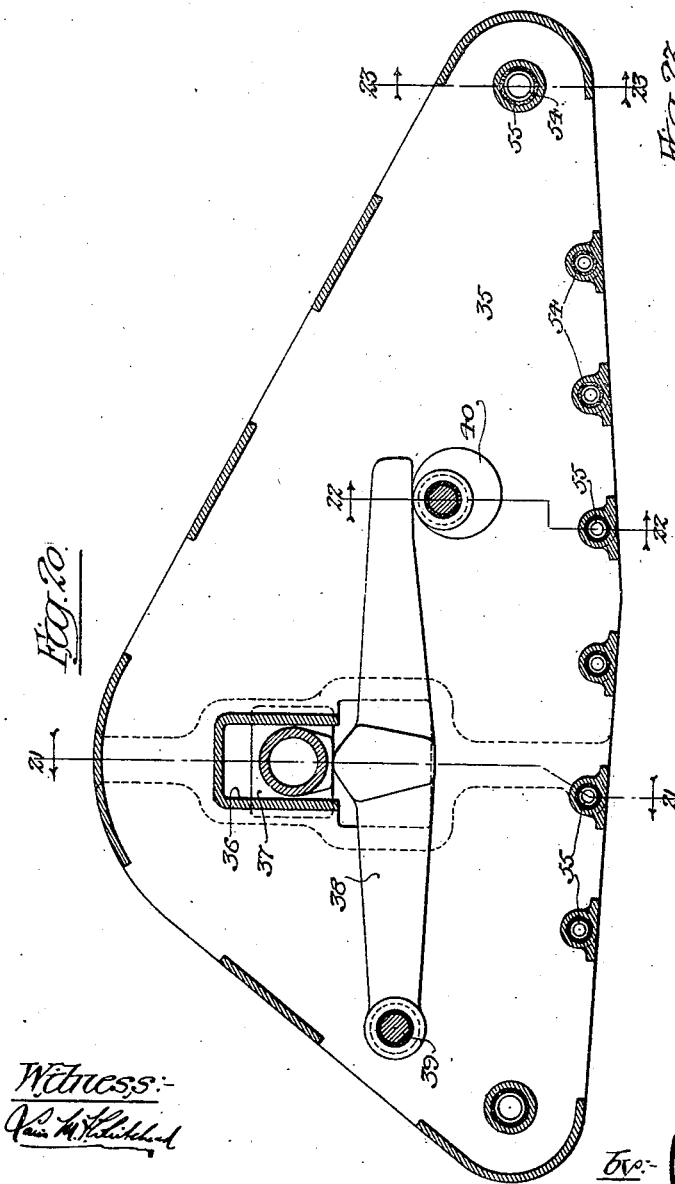
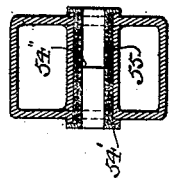
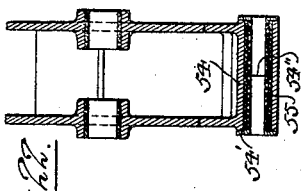
Inventor:-
Joseph M. Schutz

UNITED STATES PATENT OFFICE.

JOSEPH M. SCHUTZ, OF CHICAGO, ILLINOIS, ASSIGNOR TO SCHUTZ HAWLEY COMPANY, OF CHICAGO, ILLINOIS, A CORPORATION OF ILLINOIS.

CATERPILLAR-WHEEL.

1,319,120.      Specification of Letters Patent.      Patented Oct. 21, 1919.

Application filed January 8, 1918. Serial No. 210,856.

*To all whom it may concern:*

Be it known that I, JOSEPH M. SCHUTZ, a citizen of the United States, and a resident of Chicago, Cook county, Illinois, have invented certain new and useful Improvements in Caterpillar-Wheels, of which the following is a specification.

My invention has to do with caterpillar wheels or creepers for farm implements, tractors, trucks, tanks and gun-carriages.

The object of my invention is to provide a self-contained caterpillar wheel of such construction that the ordinary wheel being removed from an axle the caterpillar wheel may be substituted in its place. At the same time it is my purpose to construct the caterpillar wheel in such fashion that it shall not be limited to direct use upon a driving or a carrying axle, but may be framed into any ordinary vehicle structure whether of the self-propelled type or moved by a separate power.

An object which goes to the detail of easy manufacture is the provision of a caterpillar wheel which may be almost wholly constructed without machine work, or at most by machine work that is confined to its small and easy-handled parts.

One dominant idea of my invention lies in a frame for caterpillar wheels which permits the driving sprockets or like driving element to be placed upon the exterior of the frame, whereby the weaknesses and other disadvantages of the common external frame, and parts beyond the margins of the caterpillar belt, may be avoided. Further, my invention consists in a caterpillar wheel almost wholly made of cast metal parts, and which, therefore, may be turned out by an ordinary foundry that has little aid from a machine shop. A further feature of the invention resides in a dividing of the frame in such manner that relative movement of its parts shall accomplish all that is necessary in the way of loosening and tightening the caterpillar belt, as for purposes of assembly, or for the removal of the belt, and for the taking up of wear. My invention also embraces a novel arrangement and construction of the caterpillar belt or shoe, for the betterment of its stability and efficiency, and to reduce its cost.

For an exposition of the best forms in which I have embodied these and other features of the invention I refer to the accompanying drawings and the detailed explanation thereof, which follows, and especially to the appended claims:

In the accompanying drawings, which form part of this specification, Figure 1 is a side elevation of a caterpillar wheel or creeper embodying my invention;—Fig. 2 is a vertical section on the line 2—2 of Fig. 1;—Fig. 3 is a sectional detail on the line 3—3 of Fig. 1;—Fig. 4 is a section on the line 4—4 of Fig. 1;—Fig. 5 is a section on the irregular line 5—5 of Fig. 1;—Fig. 6 is an enlarged section of the caterpillar belt on the lines 6—6 of Fig. 2;—Fig. 7 is a vertical section on the line 7—7 of Fig. 6;—Fig. 8 illustrates a modified construction of the caterpillar belt, and its track upon the frame, as upon the line 8—8 of Fig. 9;—Fig. 9 is a vertical section on the line 9—9 of Fig. 8; and in part on the line 10—10 of Fig. 8;—Figs. 10 to 23, inclusive, illustrate modified forms of my invention which at the present time I regard as not so desirable as the embodiment illustrated in Figs. 1 to 9, but which, nevertheless, possess distinct advantages and utilities over present-day constructions.

Referring now to Figs. 1 to 9, it will be seen that the frame of the wheel is composed of two metal castings, A and B. These are articulated, preferably by a hinge, C, at one end, and by a jack-screw, D, at the other end.

The driving gear, E, is preferably carried by the upper part, B, of the frame and, preferably this gear in turn carries the upper stretch of the caterpillar belt, F. The end loops of the caterpillar belt run around the ends, A' and A'', of the lower member, A, of the frame. The lower stretch of the caterpillar belt operates under the bottom of the member, A. In every case I prefer that there shall be an anti-friction arrangement, G, between that part of the belt and the frame.

It is especially to be noted that the driving gear, E, which communicates movement to the caterpillar belt comprises members that are arranged upon the exterior of the frame, A—B, while the latter furnishes the bearing therefor.

As shown in Fig. 2, the caterpillar belt is of considerable width. This width multiplied by the length of the bottom stretch of the belt provides a widely distributed ground contact or bearing surface for the wheel, as required to prevent the loaded wheel from sinking into soft ground.

By this simple arrangement I provide a strong and substantial belt-carrying frame, and at the same time a strong and substantial carrier or bearing for the elements through which motion is communicated to the caterpillar belt, all within the confines of the caterpillar belt itself.

As illustrated in Figs. 1 and 2, an axle, H, may find a bearing within the hub of the driving gear, E, which is another way of saying that this caterpillar wheel may be used to replace an ordinary cylindrical wheel. Any skilled mechanic will understand that it is not necessary to thus pivot the caterpillar wheel upon an axle, H; for the frame of the vehicle, whatever its kind, may be attached directly to the wheel frame. I have thought it unnecessary to illustrate the fastening of such members to the frame of the wheel.

Likewise except to the extent of illustrating the internal gear wheel, J, which I fix to one of the driving sprockets, E, I have thought it unnecessary to depict any one of several obvious mechanisms which may be utilized for driving the members, E.

The presence of the hinge-joint, C, between the frame members, A and B, makes it a simple matter to adjust them toward and from one another by means of the jack-screw, D, whenever it is necessary to take the caterpillar belt off the frame, or to put it on, or to compensate for wear in the caterpillar belt, or between the same and the frame.

*The member A.*—This bottom member of the wheel frame, is a single casting that is flanged and cored as may best suit it to the requirements of its use. As here shown it is chiefly characterized by the parallel rails, 2, 2. These conform to the curved ends, A', A'', to suit the travel of the caterpillar belt. At its end, A', the member is provided with two upstanding ears or lugs, 3, 3, which form parts of the hinge-joint, C. The end, A'', is equipped with trunnion boxes, 4, 4, one part of each box being integral with the casting, A. The bottom, or railed portion, 5, of the casting may be curved or depressed to any extent desired to give the caterpillar a proper ground contact.

*The member B.*—The upper member B of the wheel frame is also a single iron or steel casting. It is chiefly characterized by an integral bearing, 6. The casting, B, is suitably flanged and cored; to make it light and at the same time give it requisite strength, and otherwise suit it to different uses. The long arm of the casting, B, terminates in an end, 7, which forms part of the hinge-joint, C. The short arm of the member, B, is equipped with trunnion boxes, 8.

*The hinge, C.*—This part is completed by the hinge-pin which connects the parts 3 and 7. I have given the pin a peculiar form which lends itself to foundry production and which provides for the taking up of wear between the parts of the hinge. The hinge pin proper comprises two conical sleeves, 9, 9, placed upon the bolt, 10. The parts 3 and 7 contain conical openings and these openings are occupied by cast metal (preferably Babbitt metal) linings, 11, that register in corresponding parts. When the parts 3 and 7 are assembled, the cones 9, are thrust into place, and after the parts A and B are adjusted, with respect to the caterpillar belt, the cones are tightened by means of the bolt, 10 and its nut, 10'. This operation not only properly centers the several parts of the hinge, but also converts the hinge into an operatively rigid joint between the parts A and B.

*The jack screw D.*—This mechanism comprises the right and left hand screw, 12, and the trunnioned nuts or sleeves, 13, thereof. The trunnions, 14, of the latter are held in respective boxes 4 and 8. The trunnions parallel the bearing, 6, and the hinge, C, and afford lateral rigidity. By means of the screw, 12, the parts A and B may be drawn together or thrust apart, as required to tighten and loosen the caterpillar belt, F. The nuts, 13, being trunnioned, cannot bind upon the screw, 12.

*The driving gear E.*—This gear comprises two large sprocket wheels, E, both of which are fixed upon the hub, 6. Preferably, this hub contains a central hole that receives the axle, H, of the vehicle to which the caterpillar wheel belongs. The bearing, 6, contains a cast metal (preferably babbitt) lining, 16, which also faces the ends, 6' of the bearing. This is the bearing proper for the hub, 15. The ends, 6', may contain grooves for dust-excluding rings, 17, that operate against the hub faces of respective sprocket wheels, E. The shoulder, H', of the axle may contain a similar dust-excluding packing, and the axle nut, 18, is preferably covered by a hub cap, 19; whereby dust is effectively excluded from the bearing. The sprocket wheels, E, operate in the vertical planes of respective rails, 2. They may be rotated by the axle, H, or, preferably, through the medium of a suitable gear, J, which is provided on the sprocket wheel nearest the frame of the vehicle.

*The caterpillar belt, F.*—This belt preferably comprises a plurality of identical cast metal shoes, F', which are linked together and thus formed into a continuous chain. The width of the chain is determined by the length of the shoes, F'. This length is preferably considerably greater than the distance between the rails, 2, 2, of the wheel frame, as clearly shown in Fig. 2. Most conveniently each shoe is provided with four integral lugs, 20, two at each end, which provide supports for two pairs of anti-friction rollers, 21. These rolls are V-shaped, or otherwise take their form from the rails, 2, wherewith they co-act. The width of the shoe and the spacing of the rolls, 21, are suited to the teeth of the sprocket wheels, E, so that the rolls not only co-act with the rails, 2, 2, but also co-act with the teeth of the sprocket wheels. Thus I do away with much friction between the caterpillar belt and the wheel frame, and between the belt and the sprocket wheels which drive it. The direct bearings for the rolls are formed by bolts, 22, which are held in the lugs, 20. These bolts also serve as pintles for the connecting links, 23. It is sufficient to use such links upon the inner ends only of the bolts, but I prefer to double the number of links in the manner shown in the drawings.

*Shoe construction detailed in Figs. 6 and 7.*—In casting the lugs, 20, I form large holes, 24, therein, and later fill these holes with babbitt, 25, or the like, as the easiest way to provide exact fitments for the bolts, 22. The babbitt is shaped to provide facings, 25', against which the ends of the roll run. Similarly, the babbitt portions, 25, provide facings, 25", which receive the inner sides of the links, 23. In this manner I avoid machine work upon either the inner or the outer faces of the lugs, 20. The rolls, 21, may be simple castings, and each contains a large hole, which is completed by means of a bushing or sleeve, 26, and a babbitt lining, or anchorage, 27. The babbitt lining is conveniently shaped to work against the facings, 25' and 25". The bushing 26 is initially perforated, and filled with graphite, 28, before the babbitt, 27, is poured. It will be understood that during the casting of the roller centers, the bushing, 26, is held on a temporary arbor while the roller is centered by a suitable jig, before the babbitt is poured to form the lining, 27. This method of procedure is also followed in lining the bearing, 6, the hinge joint, and the jack screw trunnions.

*Modified lubrication.*—Instead of depending upon the graphited sleeves or bushing, 26, for the lubrication of the rollers, 21, I may, as shown in Fig. 8, provide the pintle bolts with grease ducts, 29, and place a grease cup, 30, upon the inner end of each pintle bolt or spindle.

In lieu of the relatively wide shoes, F', I may employ the narrower shoes illustrated in Fig. 9. Virtually, this form is attained by dividing the shoes, F', but differs therefrom in the addition of the shoulders, 31. These shoulders co-act with the links, 32, to prevent tilting of the shoes.

Another modification which is feasible, comprises a change in the shape of the rails; ultimating in the form, 33, illustrated in Figs. 8 and 9. These rails co-act with cylindrical rolls, 34. As shown in Fig. 8, the links, 32, may be arranged between the shoe lugs and the rollers, 34, where convenient.

It will now be understood that only the small parts, and the hub, 15, need be made in a machine shop. All other work connected with the manufacture of this caterpillar wheel may be done in an ordinary foundry. No machine work is required upon the castings, A, B and F, for the bearings therein are all formed on the babbitting jig mentioned, and in such manner that jigs insure the necesary parallelism of the several parts and bearings. Where a specially fine job is required, the integral rails, 2, or 33, may be replaced by machined rails, bolted or otherwise attached to the member, A; and likewise the rollers may be machine products.

The assembling of the parts of the wheel and the operation of the caterpillar belt thereon, are so simple as to require no explanation beyond the drawings.

I desire it to be understood that my invention is not limited to making the wheel frame in two parts, as shown in Fig. 1. That is done for sake of economy and convenience in assembling and taking up wear. Much the same results may be secured by forming the wheel-frame in the manner shown in Figs. 10 and 11. In that form the frame is a triangular box-like casting, 35, which contains a vertical guide, 36, for a separate bearing block, 37, which I provide for. The block is sustained by a lever, 38, and the latter, pivoted at 39, is adjustable by means of a cam, 40. A ratchet device, 41, serves to hold the cam in adjusted position. Any desired adjustment of the caterpillar belt, 42, may be secured by this means.

As an incidental modification, I have illustrated in Figs. 10 and 11 a different type of caterpillar belt, the differences residing in the ordinary link chains, 43, which are used for joining the several shoes; and in the fastenings, 44, for the chains; which also serve as the fastenings for the studs, 45, that carry the anti-friction rolls, 46. In this form of my wheel the teeth of the driving sprockets co-act directly with the links, 43, which connect the several shoes.

Fig. 12 also illustrates the separately attached anti-friction rails, 47, before referred to.

The detailed construction of the triangular wheel frame is well represented in Figs. 14 to 17. In this form it is a unitary casting comprising the parallel vertical sides, 48, and the cross plates, 49. Like the wheel frame before described, the wheel illustrated in Figs. 10 to 17 may be connected with the vehicle frame only to the extent of its mounting upon the axle thereof, or the vehicle frame may be bolted to the wheel frame at several points.

The advantage of the axle connection between my wheels and the vehicle frame is that the two wheels upon the opposite sides of the vehicle may act like sled runners, being thereby adapted to independently adjust themselves to the irregularities of the ground without transmitting objectionable strains to the frame of the vehicle, whatever its kind.

To show that my invention is not restricted to the employment of rails upon the wheel frame, or to the employment of anti-friction rollers upon the shoes of the caterpillar belt, I have illustrated (in Fig. 18) a reversed relation of these parts. In other words, my invention comprehends the use of anti-friction rollers, 50, upon the wheel frame. Their number is determined by the length of the latter. These rollers co-act with rail-forming lugs and links on the shoes of the caterpillar belt, and are applicable to the frame illustrated in Fig. 1. Where such rollers are used, and in the absence of anti-friction rollers upon the caterpillar shoes, I prefer to add large anti-friction wheels or rolls, 51, at the ends of the wheel frame. The peripheries of the rolls, 50 and 51, partake of the form of the parts wherewith they co-act. This is clearly indicated in Fig. 19. In providing supports for these rollers I follow the babbitting method hereinbefore described. As indicated in Fig. 19, the rollers (50 or 51) are fixed upon the ends of their shafts, 52. The inner hub faces contain packing grooves, 53. The direct bearing for each shaft is formed by a perforated sleeve, 53', containing graphite or other lubricant. This sleeve is located and locked in place by the jigging process before described, being secured by the babbitt lining, 54, which is poured into the large cored hole, 55, of the casting, while the casting is on the jig.

To avoid relying upon mere babbitt facings for the ends of the bearings, I may use flanges, 54', on the sleeves, 54. In this case each sleeve is divided at the center, 54'', as best shown in Figs. 21, 22, and 23. The making of the sleeve in two parts does not interfere with the jig babbitting of the casting, for obviously the parts of the sleeve are held by the arbor in the jig, while babbitt is being poured in around the sleeves.

A novel feature of the caterpillar belts shown in Figs. 10 to 18 resides in the beveling of the edges of the shoes as indicated at points 56; which causes them to overlap, and thus close the joints in the straight stretches of the belt.

The triangular form of wheel which results from the elevation of the driving sprocket, secures sufficient contact with the belt, removes the sprockets from the ground, and makes it an easy matter to substitute these wheels for the cylindrical wheels now found upon tractors, and the like, without reducing the clearance between the ground and the vehicle axle.

The many novelties and utilities of my caterpillar wheels in their various sizes and designs will be apparent to one who is skilled in the art; likewise the ease with which the wheels may be designed to suit the requirements of various vehicles and various drives.

Having thus described my invention, I claim as new and desire to secure by Letters Patent:

1. A caterpillar wheel frame comprising two adjustably articulated parts, one of which carries a caterpillar belt driving element.

2. A caterpillar wheel comprising upper and lower frame members, having hinge parts in combination with metal cones, serving as substitutes for a hinged pin, and a bolt for driving said cones to place.

In testimony whereof, I have hereunto set my hand this 22nd day of December, 1917.

JOSEPH M. SCHUTZ.